2,845,422

SUBSTITUTED S-TRIAZINES AND METHOD OF PREPARATION

Frederic Charles Schaefer, Darien, and Grace Ann Peters, Stamford, Conn., assignors to American Cyanamid Company, New York, N. Y., a corporation of Maine No Drawing. Application April 22, 1957
Serial No. 654,060

13 Claims. (Cl. 260—248)

This invention relates to improved processes for preparing mono-substituted triazines. More particularly, it relates to a new and novel reaction of s-triazine with any of a variety of amidine compounds containing a guanyl group to recover a mono-substituted triazine.

To the present, a satisfactory method has not been developed whereby a mono-substituted triazine can be obtained. Tedious procedures have been suggested but none has been proven wholly satisfactory. For instance, in a three step synthesis, cyanuric chloride has been initially reacted with a Grignard reagent such as phenyl magnesium bromide to form 2-phenyl-4,6-dichloro-s-triazine. The latter is then reacted with sodium hydrosulfide. Resultant 2 - phenyl-4,6 - dimercapto-s - triazine is finally treated with hydrogen in the presence of Raney nickel to prepare monophenyl s-triazine. Such a procedure is laborious, time-consuming and expensive. Accordingly, it does not lend itself to commercial exploitation.

It is a principal object of the present invention to provide a novel method for preparing mono-substituted triazine in a direct manner. Another object is to provide a novel method for directly preparing mono-substituted triazines from the reaction of unsubstituted s-triazine and an amidine compound. Other objects and advantages will become apparent from the ensuing detailed description.

It has been found that unexpectedly s-triazine can be reacted with basic amidines of $pK_b$ value equal to less than 7. Thus, mono-substituted s-triazine derivatives can be prepared directly. This is a surprising reaction due to the known sensitivity of the unsubstituted s-triazine ring to nitrogen bases. For example, it has been reported in the Journal American Chemical Society 77, 6559, (1955), and Journal Organic Chemistry 21, p. 1037, (1956), that the s-triazine ring is degraded in the presence of amino compounds or their corresponding salts. When a base is present, mono-substituted s-triazines are not formed in such degradation reactions. Nonetheless, according to this invention, even in the presence of a strongly basic amidine or salt thereof, mono-substituted triazines are obtained in good yield and purity.

According to the process of the invention, s-triazine and an amidine compound per se or its acid addition salt thereof may be reacted to form the corresponding mono-substituted derivative. For instance, although an amidine compound per se can be employed, the reaction will be illustrated utilizing an amidine addition salt in the following equation:

$$\text{(s-triazine)} + \text{(amidine acid addition salt)} \cdot HAn \longrightarrow$$

$$\text{(mono-substituted s-triazine)} + \text{(formamidine acid addition salt)} \cdot HAn$$

where R is a radical such as alkyl, aryl, aralkyl, alkoxy, alkylthio, aryloxy, chloroalkyl, β-hydroxyethyl, amino, N-alkylamine and N-arylamino, and An is an anion such as carbonate, acetate or halide. The s-triazine product may be recovered by conventional methods, such as distillation, crystallization and the like.

As indicated in the above equation, the proportions of reactants are equimolar. However, an excess of either reactant can also be suitably reacted. Such proportions are therefore not critical. Similarly, the order of addition of reactants is not of critical import. Thus, the s-triazine can be added to the amidine compound, or the latter can be introduced into the s-triazine, or both can be admixed simultaneously. The latter procedure is a preferred practice.

The reaction may be conducted at room temperature in the presence of an inert solvent. Usually temperatures of between 20° C. and 30° C. are used. However, elevated temperatures up to about 100° C. or more can also be used to advantage.

Any of a large variety of amidine bases can be employed in the process of the invention. Also contemplated are the salts of the free bases. Typical illustrative amidines having the guanyl grouping $$-C\diagup\!\!\!\diagdown \begin{matrix} NH \\ NH_2 \end{matrix}$$

include:

| | |
|---|---|
| Acetamidine | O-methylisourea |
| Propionamidine | S-methylisothiourea |
| Butyramidine | S-ethylisothiourea |
| Lauramidine | S-phenylisothiourea |
| Benzamidine | Trichloroacetamidine |
| α-Naphthamidine | β-Hydroxypropionamidine |
| α-Phenylacetamidine | Guanidine |
| Phenylpropionamidine | N-dodecylguanidine |
| Phenylbutyramidine | N-phenylguanidine | and their corresponding acid addition salts, such as:

Acetamidine hydrochloride
Propionamidine hydrochloride
Propionamidine hydrobromide
S-methylisothiourea hydroiodide
N-dodecylguanidine acetate
N-phenylguanidine carbonate Any of the above amidines and acid addition salts thereof, as well as the s-triazine reactant, can be prepared by methods well known to the art.

The products produced according to the process of the invention possess a variety of uniquely interesting utility. For example, the monoalkyl- or monoaryl-s-triazines find utility as fumigants or insecticides. Moreover, the amino- or N-alkylamino-s-triazines, such as dodecyl-amino-s-triazine, possesses acaracidal and fungicidal activity. The alkoxy- or phenoxy-s-triazines are useful in preparing a bactericide, such as 2-sulfanilamido-s-triazine. The latter can be prepared by reacting 2-methoxy-s-triazine with sodium sulfanilamide. Other monosubstituted alkyl triazines, such as β-hydroxyethyl-s-triazine, find utility as an intermediate in preparing 2-vinyl-s-triazine, which can form useful polymers.

For a clearer understanding of the invention, the following examples are presented for purposes of illustration. These are not intended to be construed as being limitative. Unless otherwise specified, the parts are by weight.

Example 1

Into a suitable reaction vessel equipped with stirrer and fractionating column is added 0.1 mol s-triazine. Over a period of 40 minutes, 0.14 mol acetamidine in 45 cc. methanol is added slowly and stirred. Reaction proceeds at 25° C. for an additional 40 minutes. The contents in the vessel are then fractionally distilled. The product, 2-methyl-s-triazine, is recovered within a boiling point range of 113° C.–125° C. in good yields.

Example 2

The preceding example is repeated in every detail except that β-hydroxypropionamidine is substituted for acetamidine. It is found that 2-(β-hydroxyethyl)-s-triazine is obtained, boiling at 100° C. at 7 mm. pressure. Product is readily converted by dehydration with acetic anhydride to 2-vinyl triazine.

Example 3

Into the apparatus described in Example 1 is added an equimolecular mixture of trichloroacetamidine hydrochloride and s-triazine in acetonitrile. The mixture is heated to about 40° C. for 45 minutes and then increasing the temperature to 80° C. for an additional 30 minutes. Upon cooling, formamidine hydrochloride is formed as a solid and removed from the mixture. The liquid phase is fractionally distilled to recover product, 2-trichloromethyl-s-triazine of B. P. 108° C./19 mm. and refractive index is 1.5392 at 25° C. in good yield.

Example 4

Substituting equimolecular quantities of β-acetoxypropionamidine hydrochloride and triazine in acetonitrile for the reactants of Example 3 and following the procedure in every detail therein, 2-(β-acetoxyethyl)-s-triazine is obtained by cooling to below about 15° C. At room temperature, the latter is spontaneously converted to 2-vinyl triazine.

Example 5

A mixture of equimolecular quantities of phenylacetamidine hydrochloride and s-triazine in acetonitrile are heated and agitated in a suitable vessel maintained at 80° C. for about two hours. Formamidine hydrochloride forms as a by-product which crystallizes from solution when cooled. The remaining solution is fractionally distilled to recover a good yield of 2-benzyl-s-triazine at 100° C.–105° C. and 2 mm. Hg pressure.

Example 6

A mixture of benzamidine hydrochloride and s-triazine in equimolecular quantities is reacted at 25° C. in methanol for 18 hours. The product, 2-phenyl-s-triazine is precipitated from reaction by the dilution of the reaction medium with water. It has a melting point of 65° C.–67° C. obtained in good yield.

Example 7

Repeating the foregoing example in every detail except that m-nitrobenzamidine hydrochloride is substituted for the benzamidine hydrochloride therein, 2-(m-nitrophenyl)-s-triazine in good yield is obtained, the latter having a melting point of 120° C.–122° C.

Example 8

A mixture of 0.02 mol of terephthalamidine dihydrochloride and 0.03 mol of s-triazine in methanol is admixed in a suitable reaction vessel and heated to 65° C. for 25 hours. Resultant 2,2'-(p-phenylene)-ditriazine having a melting point of 298° C.–299° C. is recovered.

Example 9

To a suitable reaction vessel is added a mixture of 0.20 mol of O-methylisourea hydrochloride and 0.15 mol of s-triazine in ethanol. The mixture is heated at 78° C. for two hours. Resultant reaction product is distilled at 65° C.–67° C. and 15 mm. Hg to recover 2-methoxy-s-triazine in good yield.

Example 10

To a suitable reaction vessel equipped with fractionating column is added a mixture consisting of equimolecular quantities of S-methylisothiourea hydroiodide and s-triazine in acetonitrile and is admixed while agitating at 25° C. for 2 hours. When cooled, by-product formamidine hydroiodide crystallizes from the reaction mixture. Resultant 2-methylthio-s-triazine having a boiling point of 75° C. at 7 mm. pressure is recovered by fractional distillation.

Example 11

A mixture of 0.075 mol of guanidine hydrochloride and 0.050 mol of s-triazine in the presence of ethanol is caused to react at 78° C. for 1.5 hours. Resultant product, 2-amino-s-triazine of melting point 224° C.–227° C. is recovered.

Example 12

A mixture of phenylguanidine carbonate (0.050 equivalent) and triazine (0.034) in ethanol is reacted at 78° C. for 2 hours. Resultant product, 2-phenylamino-s-triazine of melting point 171° C.–173° C. is recovered in good yield.

Example 13

Equimolecular quantities of octylguanidine carbon dioxide salt (i. e., octylguanidinium N-octylcarbamate) and s-triazine in ethanol are reacted at 78° C. for 2 hours. Resultant product, 2-n-octylamino-s-triazine of M. P. 70° C.–71° C. crystallizes upon cooling and is recovered.

Example 14

An equimolecular quantity of dodecylgnanidine and s-triazine in ethanol is heated at about 80° C. for 1.5 hours. Resultant 2-dodecylamino-a-triazine, recrystallized from ethyl acetate, is recovered. It has a melting point of 83° C.–84° C.

Example 15

This example illustrates the utility of dodecylamino-s-triazine (DAST) as a contact acaricide.

Lima bean plants infested with mites are dipped in a 0.1% solution of dodecylamino-s-triazine solution consisting of 65% acetone and 35% water. The plants are dried and held for 2 days at 80° F. and 60% relative humidity. The mortality of the mites is determined by counting the live and dead mites under a microscope. At the above dosage, a 37% kill is noted.

We claim:

1. An improved method for producing mono-substituted s-triazines which comprises the steps of: reacting s-triazine and an amidine of pK$_b$ value of less than 7 and having the general formula:

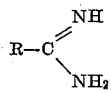

wherein R is selected from the group consisting of alkyl, aryl, aralkyl, alkoxy, alkylthio, aryloxy, chloroalkyl, β-hydroxyalkyl, amino, N-alkylamino, N-arylamino, and acid addition salts thereof, and recovering the resultant mono-substituted s-triazine.

2. An improved method for preparing monomethyl-s-triazine which comprises the steps of: reacting s-triazine and acetamidine hydrochloride, and recovering the resultant mono-substituted s-triazine.

3. The process of claim 1 in which the reaction is carried out at temperatures between about 20° C. and 100° C.

4. An improved method for preparing monoethyl-s-triazine which comprises the steps of: reacting s-triazine and propionamidine hydrochloride, and recovering resultant monoethyl s-triazine.

5. An improved method for preparing monobenzyl s-triazine which comprises the steps of: reacting s-triazine and phenylacetamidine hydrochloride, and recovering resultant monobenzyl substituted s-triazine.

6. An improved method for preparing monophenyl s-triazine which comprises the steps of: reacting s-triazine and benzamidine, and recovering resultant monophenyl s-triazine.

7. An improved method for preparing monophenyl s-triazine which comprises the steps of: reacting s-triazine with benzamidine hydrochloride, and recovering resultant monophenyl s-triazine.

8. A process for preparing monomethoxy s-triazine which comprises the steps of: reacting s-triazine and O-methylisourea hydrochloride, and recovering resultant mono-substituted s-triazine.

9. A process for preparing monomethylthio s-triazine which comprises the steps of: reacting S-methylisothiourea hydroiodide and s-triazine, and recovering resultant mono-substituted s-triazine.

10. A process according to claim 9 in which the reaction is carried out at a temperature of about 80° C.

11. An improved process for preparing dodecylamino-s-triazine which comprises the steps of: reacting s-triazine and N-dodecylguanidine, and recovering mono-substituted s-triazine.

12. As a new composition of matter, monomethoxy-s-triazine.

13. As a new composition of matter, dodecylamino-s-triazine.

References Cited in the file of this patent
UNITED STATES PATENTS
2,714,057   Chenicek _____ July 26, 1956